United States Patent [19]
Lorbiecki et al.

[11] Patent Number: 5,498,381
[45] Date of Patent: Mar. 12, 1996

[54] METHOD OF FORMING AND PIERCING A THERMOPLASTIC STRIP IN ONE STEP

[75] Inventors: James R. Lorbiecki, Milwaukee; Susan J. Lutz, Waukesha, both of Wis.

[73] Assignee: Milsco Manufacturing Company, Milwaukee, Wis.

[21] Appl. No.: 360,377

[22] Filed: Dec. 21, 1994

[51] Int. Cl.⁶ ............................................. B29C 65/56
[52] U.S. Cl. .................... 264/46.4; 29/91.1; 29/453; 264/156; 264/230; 264/274; 264/279.1; 264/342 R; 264/DIG. 67; 425/298
[58] Field of Search ........................... 264/230, 325, 264/342 R, 279.1, 324, 275, 274, 156, 320–321, DIG. 67, 46.4; 425/4 R, 290, 310, 298; 29/453, 91.1

[56] References Cited

U.S. PATENT DOCUMENTS

| | | | |
|---|---|---|---|
| 3,026,569 | 3/1962 | Keller | 264/325 |
| 3,258,511 | 6/1966 | McGregor, Jr. | 264/156 |
| 3,298,885 | 1/1967 | Grimshaw | 264/274 |
| 3,740,014 | 6/1973 | Swenson et al. | |
| 4,190,697 | 2/1980 | Ahrens | 264/46.4 |
| 4,204,825 | 5/1980 | Furnas | |
| 4,323,406 | 4/1982 | Morello | 264/275 |
| 4,405,681 | 9/1983 | McEvoy | |
| 4,643,857 | 2/1987 | Cousin et al. | 264/156 |
| 4,647,109 | 3/1987 | Christophersen et al. | |
| 4,673,542 | 6/1987 | Wigner et al. | 264/275 |
| 4,726,086 | 2/1988 | McEvoy | |
| 4,833,741 | 5/1989 | Mizuno et al. | 264/275 |
| 4,836,609 | 6/1989 | Hill | |
| 5,013,090 | 5/1991 | Matsuura | 264/275 |
| 5,158,634 | 10/1992 | Kasuya | 264/46.7 |
| 5,176,356 | 1/1993 | Lorbiecki et al. | |
| 5,183,314 | 2/1993 | Lorbiecki | |
| 5,344,215 | 9/1994 | Dahlbacka | |
| 5,400,490 | 3/1995 | Burchi | 264/46.7 |

FOREIGN PATENT DOCUMENTS 1399906  7/1975  United Kingdom ............ 264/156

*Primary Examiner*—Jeffery R. Thurlow
*Attorney, Agent, or Firm*—Nilles & Nilles

[57] ABSTRACT

Methods for forming a strip of thermoplastic material by punch clamping are described. One method includes providing a clamping mold with i) a surface having at least one die space and ii) at least one clamp having at least one punch tip located in a punch body; providing a strip of thermoplastic material having a softening temperature and a melting temperature; heating the strip of thermoplastic material to a working temperature higher than the softening temperature and lower than the melting temperature; placing the strip of thermoplastic material in the clamping mold and against the surface and over the at least one die space; forming the strip of thermoplastic material by closing the at least one clamp so as to a) form the strip of thermoplastic material with the at least one clamp and b) pierce the strip of thermoplastic material with the at least one punch tip, in one step; cooling the strip of thermoplastic material to a removal temperature lower than the softening temperature; opening the at least one clamp; and removing the strip of thermoplastic material from the clamping mold. The methods provide advantages in that the time required to form the strip of thermoplastic material is reduced, the need for expensive injection molding equipment is obviated and the configuration of the resultant rings can be quickly modified to permit flexible manufacturing by simply changing the configuration of the clamping mold.

21 Claims, 12 Drawing Sheets

METHOD OF FORMING AND PIERCING A THERMOPLASTIC STRIP IN ONE STEP

BACKGROUND OF THE INVENTION

1. Field of Use

The present invention relates generally to the field of seating. More particularly, the present invention concerns a method of assembling a seat that includes a seat shell. Specifically, a preferred embodiment of the present invention is directed to the assembly of a seat that includes a flexible seat shell and cushions. The present invention thus relates to methods of assembling seats of the type that can be termed flexible seat shell seats.

2. Description of Related Art

Within this application several publications are referenced by arabic numerals within parentheses. Full citations for these publications may be found at the end of the specification immediately preceding the claims. The disclosures of all these publications in their entireties are hereby expressly incorporated by reference into the present application.

Heretofore, it was known in the prior art to provide a seat having a separate back and base. A conventional seat is typically assembled by providing two separate cushions (i.e., a back cushion and a base cushion) together with a frame. For example, a conventional seat can be assembled by bolting, or screwing, one of the two separate cushions to a tubular steel frame followed by bolting, or screwing, the other cushion to the tubular steel frame.

A previously recognized problem has been that the time required for assembly a seat having two separate cushions is lengthy. What is needed therefore is way of assembling the seat that requires less time.

Heretofore, it was also known in the prior art to attach cushions to a seat frame with fasteners. For example, a conventional seat can be assembled by bolting, or screwing, one of the two separate cushions to a tubular steel frame followed by bolting, or screwing, the other cushion to the tubular steel frame.

A previously recognized problem has been that numerous fasteners are required for assembling such a seat. What is also needed therefore is way of assembly that requires fewer fasteners.

Heretofore, it was also known in the prior art to injection mold the various parts of a seat. For example, the cushions of seats have been known to include a plastic ring that permits mounting screws to be driven into the cushion with resiliency. Such a conventional plastic ring is typically injection molded at high pressure in a large metal mold.

A previously recognized problem has been that tooling for injection molding is expensive. What is also needed therefore is an inexpensive way of molding plastic parts for inclusion in a seat.

Heretofore these requirements have not been fully met without incurring various disadvantages.

One unsatisfactory previously recognized solution to the problems of using a separate back and base was to injection mold a unitary seat shell. By combining the back and base into one unit, the time required for assembly is reduced. As noted above, a disadvantage of this previously recognized solution is that injection mold tooling is expensive. Further, this previously recognized solution also has the disadvantage that some fasteners are still required to attach the seat shell to the frame.

Heretofore, it was known in the prior art to thermoform a sheet of plastic. Methods of thermoforming plastic are described in "Thermoforming" by James L. Throne, Hanser Publisher, New York (1987) and in "Guide to Extruded Plastic Sheet Products" by the Society of Plastic Industry, (1988). For example, a sheet of thermoplastic is typically thermoformed with a vacuum thermoform mold.

A previously recognized problem with thermoforming has been that thermoforming is limited to fabricating shapes of limited relief. If the amount of relief is too high, impermissible thinning of the thermoplastic material thickness results in the high relief sections of the mold. Further, if the amount of relief is too high, the decorative embossment of the thermoplastic is disrupted in the high relief sections of the mold. For example, a rigid unitary seat shell is a high relief design because of the angular junction between the back of the seat and the base of the seat. In the case of a high relief shape such as a unitary seat shell, thermoforming the finished shape results in an impermissibly thin edge at the junction of the back section and the base section because of the amount of draw required to form the angular junction between the back of the seat and the base of the seat. Moreover, the decorative embossment of the thermoplastic material would be unattractively disrupted at both the top of the back and at the front of the base because of the amount of draw required to form the angular junction.

The below-referenced prior patents disclose embodiments that were satisfactory for the purposes for which they were intended but which had disadvantages. The disclosures of all the below-referenced prior patents in their entireties are hereby expressly incorporated by reference into the present application.

U.S. Pat. No. 5,344,215 discloses a backrest recliner mechanism. U.S. Pat. No. 5,183,314 discloses a concealed mechanism for detachably mounting a vehicle seat. U.S. Pat. No. 5,176,356, discloses a suspension for a vehicle seat. U.S. Pat. No. 4,836,609 discloses a unitary shell for a vehicle seat. U.S. Pat. No. 4,726,086 discloses a composite foam seat cushion. U.S. Pat. No. 4,647,109 discloses a upholstered seat assembly and a one-piece seat and back shell of molded plastic. U.S. Pat. No. 4,405,681 discloses a foam cushion. U.S. Pat. No. 3,740,014 discloses an adjustable seat assembly for a vehicle.

In embodiments disclosed in the above-referenced prior patents without unitary seat shells, the back and base cushions of the seats are disclosed as being separately connected to the underlying frame. Such a non-unitary approach has the disadvantage that assembly costs are increased due to the above-discussed increase in the number of fasteners required for assembly, as well as the above-discussed increase in the time required for assembly. Those embodiments disclosed in the above-reference prior patent having unitary seat shells have the disadvantage that expensive tooling is required to injection mold the seat shells. Further, a certain number of separate assembly fasteners are still required to attach such injection molded unitary seat shells to the underlying flames.

SUMMARY OF THE INVENTION

It is therefore an object of the present invention to provide a method of assembling a seat comprising: providing a flame with a plurality of hooks and a plurality of protrusions; providing a flexible seat shell with a plurality of flame sockets and a plurality of flame slots; inserting the plurality of protrusions into the plurality of frame sockets so as to engage the plurality of frame sockets with the plurality of projections; inserting the plurality of hooks into the plurality of frame slots; and displacing the flexible seat shell so as to engage the plurality of frame slots with the plurality of hooks.

In accordance with this aspect of the present invention, a method of forming a plastic ring is provided comprising: providing a forming mold with a surface and at least one clamp; providing a strip of thermoplastic material having a softening temperature and a melting temperature; heating the strip of thermoplastic material to a working temperature higher than the softing temperature and lower than the melting temperature; placing the strip of thermoplastic material in said forming mold and against said surface; forming the strip of thermoplastic material by closing the at least one clamp; cooling the strip of thermoplastic material to a removal temperature less than the softing temperature; opening the at least one clamp; and removing the strip of thermoplastic material from the die space.

Further in accordance with the above aspects of the present invention, in a seating arrangement, a frame is provided comprising: a first frame member, the first frame member including a first hook and a first protrusion; and a second frame member, the second frame member including a second hook, a second protrusion and being connected to the first frame member.

Other aspects and objects of the present invention will be more appreciated and understood when considered in conjunction with the following description and drawings.

BRIEF DESCRIPTION OF THE DRAWINGS

The advantages and features of the present invention will become more readily apparent with reference to the detailed description which follows and to exemplary, and therefore non-limiting, embodiments illustrated in the following drawings in which like reference numerals refer to like elements and in which.

DESCRIPTION OF THE PREFERRED EMBODIMENTS

Figure 1:
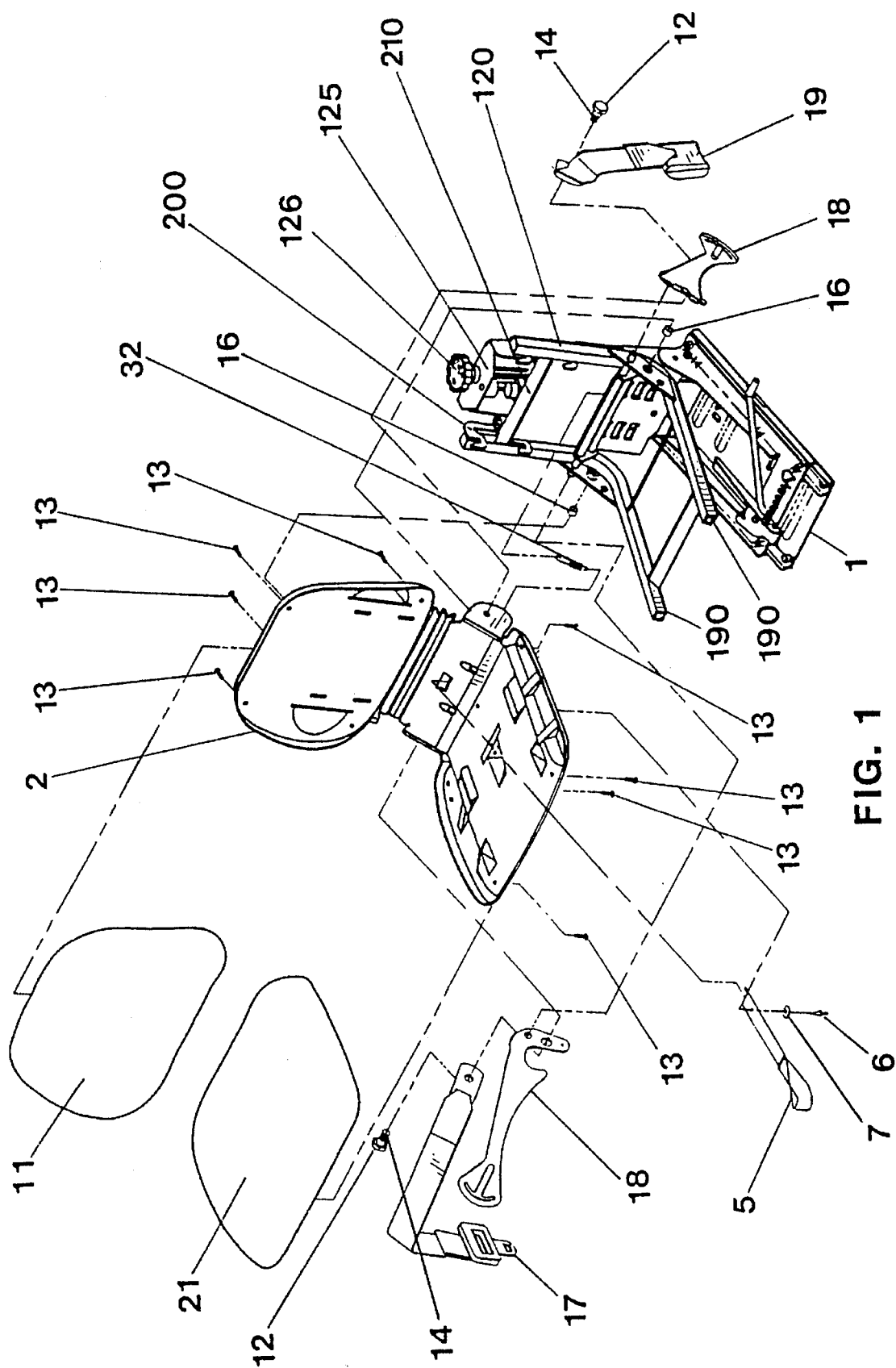
FIG. 1 illustrates an exploded isometric view of a seat assembly according to the present invention.

The present invention and various aspects, objects, advantages, features and advantageous details thereof are explained more fully below with reference to exemplary, and therefore non-limiting, embodiments described in detail in the following disclosure and with the aid of the drawings. In each of the drawings, parts the same as, similar to, or equivalent to each other, are referenced correspondingly.

1. Resume

All the disclosed embodiments can be realized using conventional materials, components and procedures without undue experimentation. All the disclosed embodiments are useful in conjunction with the fabrication of vehicle seats such as are used as driver's or operator's seats on vehicles such as farm tractors, construction machines, or the like.

2. System Overview

Referring to the drawings, it can be seen that one aspect of present invention includes connecting a flexible seat shell to a frame. Another aspect of the present invention includes providing cushions that incorporate plastic rings that are formed by clamping. Another aspect of the present invention includes providing a frame that includes hooks and protrusions that engage the flexible seat shell. Pursuant to the present invention, the flexibility of the seat shell permits the flexible seat shell to be assembled together with the frame without the need for fasteners, although fasteners can be used for supplementary attachment of the flexible seat shell to the frame. For example, seat belt bolts can be provided to serve the dual purpose of attaching a seat belt to the frame and connecting the seat shell to the frame with additional rigidity.

By thermoforming the unitary seat shell with an intermediate section that functions as a hinge, several additional advantages are obtained. By thermoforming the shell in one configuration and then deflecting the back section and base section with regard to the angular relationship therebetween, the previously recognized problems of impermissible thinning and decorative embossment disruption in high relief areas of a thermoformed design are solved since the shell is thermoformed in a relatively flat, relatively low relief, configuration. The relatively low relief of the corresponding thermoforming mold results in much better uniformity of thickness across the entire area of the flexible seat shell and along the full perimeter of the flexible seat shell. Further, there is much less disruption of the decorative embossment of the thermoplastic material from which the flexible seat shell is fabricated. Since the relief of the thermoforming mold is relatively low, the design of the thermoforming mold can incorporate various features such as snap-fit protrusions, frame sockets and lateral deflection protrusions. The ability of the mold to incorporate such features increases the design flexibility. In a preferred embodiment, fastening structures can be integrally formed into the shell itself, thereby further reducing the number of fasteners required to attach the shell to the frame of a seat. In an especially preferred embodiment, no fasteners are required to attach the shell to the frame of a seat. Moreover, no expensive injection mold tooling is required to fabricate the flexible seat shell because the flexible seat shell can be thermoformed with a relatively inexpensive vacuum thermoforming mold.

By attaching a cushion that includes a plastic rings that is formed by clamping a strip of thermoplastic material against a clamping mold several additional advantages are obtained. Fastening structures can be integrally formed directly into the plastic ring with clamps when the clamps are closed against the strip of thermoplastic material so as to clamp the strip of thermoplastic material against the clamping mold and form the plastic ring, thereby reducing the time required to complete the plastic ring, as well as the number of fasteners required to attach the cushions to the flexible seat shell. For example, four holes can be punched into the strip of thermoplastic material when the clamps are closed against the strip of thermoplastic material by providing each of the clamps with a punch tip within a punch body and providing corresponding die spaces in the clamping mold so that the only fasteners required to attach the cushion to the flexible seat shell are four simple screws. Further, the configuration of the plastic rings can be modified easily by changing the configuration of the clamping mold. Moreover, as above, no expensive injection mold tooling is required to fabricate the plastic rings because the plastic rings are formed when the strips of thermoplastic material are clamped.

By using a frame that includes hooks, protrusions and a bar that engage the flexible seat shell, several additional advantages are obtained. Providing the frame with hooks, protrusions and a bar that engage the flexible seat shell reduces the amount of time, and skill, required to assemble a seat. Further, the number of separate parts required to assemble a seat is reduced. Moreover, no jig is required to position the flexible seat shell with respect to the frame.

If a more complete description of the structure and operation of the invention as shown in FIGS. 2–8 are deemed to be either necessary or desirable, reference may be had to commonly assigned, copending U.S. application Ser. No. 08/339,004, filed on Nov. 14, 1994 by Lorbiecki who is one of the inventors of the presently claimed invention, the entire contents of which are hereby expressly incorporated herein. That application is directed to and claims both a seating arrangement that includes a flexible unitary seat shell and a method of making such a flexible unitary seat shell.

3. Detailed Description

Referring to FIG. 1, an exploded isometric view of a seat assembly according to the present invention is illustrated where a frame base 1, is provided to support a flexible seat shell 2, that is configured in an upright position. The flexible seat shell 2, is preferably elastically deformed approximately 90 degrees from the position in which the flexible seat shell 2, was formed when in a state of final assembly for use. Seat belts 19, are preferably passed through seat belt brackets 18, and attached to frame 120, with seat belt bolts 12. Seat belt bolts 12, pass through bushings 16, and connect with frame 120, by means of seat belt bolt threads 14, or equivalents thereof.

Still referring to FIG. 1, the illustrated configuration of the flexible seat shell 2, is an elastic deformation of approximately 90 degrees from the as formed configuration. Advantageously, the flexible seat shell 2, should be capable of being elastically deformed at least approximately 120 degrees, more advantageously at least approximately 150 degrees, or even more advantageously at least approximately 180 degrees from the thermoformed configuration so as to provide reserve flexibility. Strap 5, can be attached to the flexible seat shell 2, with rivet 6, and washer 7. Screws 13, can be inserted through the flexible seat shell 2, so as to attach back cushion 11, and bottom cushion 21. Spring 32, can be connected between flexible seat shell 2, and frame 120.

Still referring to FIG. 1, frame 120, preferably includes a plurality of protrusions 190, and a plurality of hooks 200. An especially preferred embodiment of frame 120, includes bar 210. Bar 210, can be orthogonally arranged with respect to hooks 200. The frame 120, is connected to the frame base 1, with suspension 125. Suspension 125, is preferably provided with an adjustment means 126, for adjusting a variable resistance mechanism, not visible in FIG. 1, that is located within suspension 125, which supports the weight of an individual using the seat.

Figure 2:
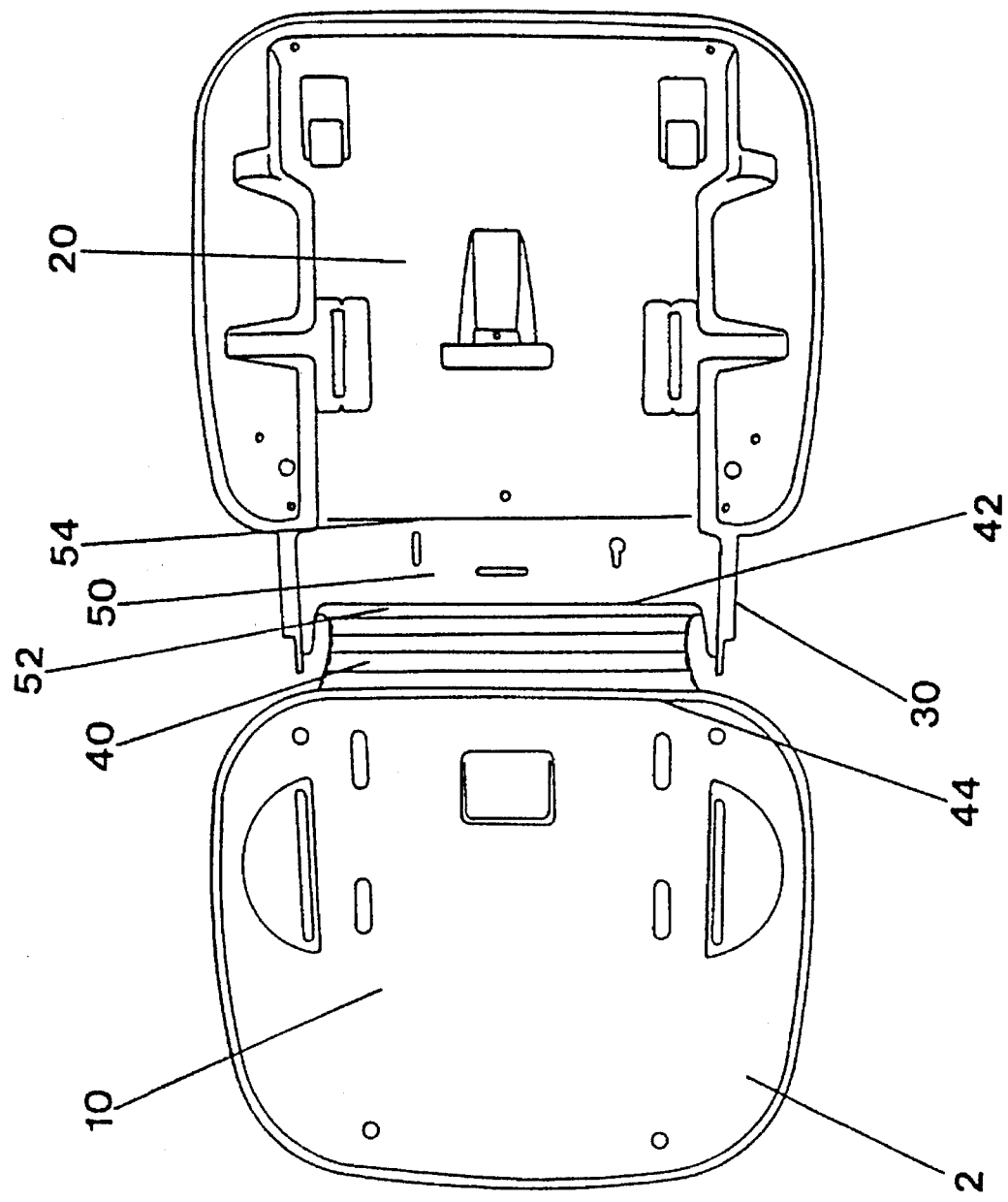
FIG. 2 illustrates a plan view of a first side of a flexible seat shell according to the present invention.

Referring now to FIG. 2, a plan view of a first side of a flexible seat shell 2, according to the present is illustrated where a back section 10, and a base section 20, are clearly visible. The back section 10, is connected to base section 20, through an intermediate section 30, forming a hinge between base section 20, and the back section 10, to permit elastic changes in the angular relationship therebetween of at least 60 degrees. In a preferred embodiment, intermediate section 30, includes an elongated flexible section 40, defining a hinge or an axis of deflection. In a preferred embodiment, the flexible section 40, is formed as an accordion pleat that includes a series of parallel grooves. The elongated flexible section 40, includes a first flexible section edge 42, substantially parallel to the axis of deflection and a second flexible section edge 44, substantially parallel to the axis of deflection. In a preferred embodiment, intermediate section 30, includes an elongated resilient section 50, connected to the elongated flexible section 40. The elongated resilient section 50, defines a resilient section axis that is substantially parallel to the axis of deflection. The elongated resilient section 50, includes a first resilient edge 52, that is substantially parallel with the resilient section axis and is continuously connected to the first flexible section edge 42, of the elongated flexible section 40. The elongated resilient section 50, includes a second resilient edge 54, that is substantially parallel to the resilient section axis.

Figure 3:
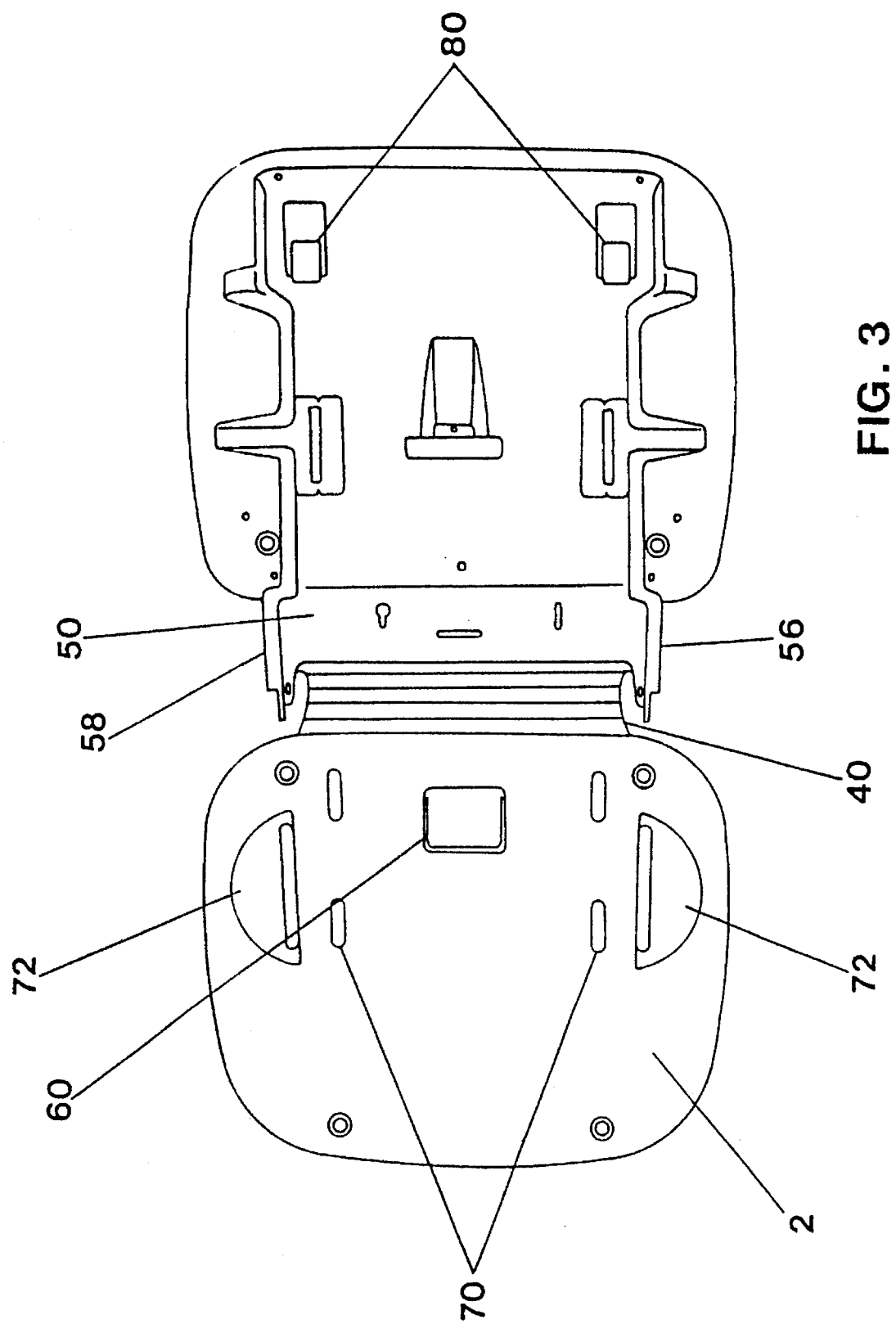
FIG. 3 illustrates a plan view of a second side of the flexible seat shell shown in FIG. 2.

Referring now to FIG. 3, a plan view of a second side of the flexible seat shell 2, as shown in FIG. 2, is illustrated where an outside of the back section 10, and an outside of the base section are clearly visible. The elongated resilient section 50, includes a first side 56, that is substantially perpendicular to the resilient section axis. The elongated resilient section 50, includes a second side 58, that is substantially perpendicular to the resilient section axis.

Still referring to FIG. 3, a snap-fit protrusion 60, is designed to engage a structural member of a seat frame, not shown in FIG. 3, to which the flexible seat shell 2, will be connected. The snap-fit protrusion 60, is preferably designed to engage a resilient bar provided on the frame. Frame slots 70, are similarly designed to engage the frame. Frame slots 70, are preferably designed to engage hooks provided on the frame. The back section 10, is preferably provided with lateral deflection protrusions 72. Frame sockets 80, are similarly designed to engage the frame. Frame sockets 80, are preferably designed to engage tubular projections provided on the frame.

Figure 4:
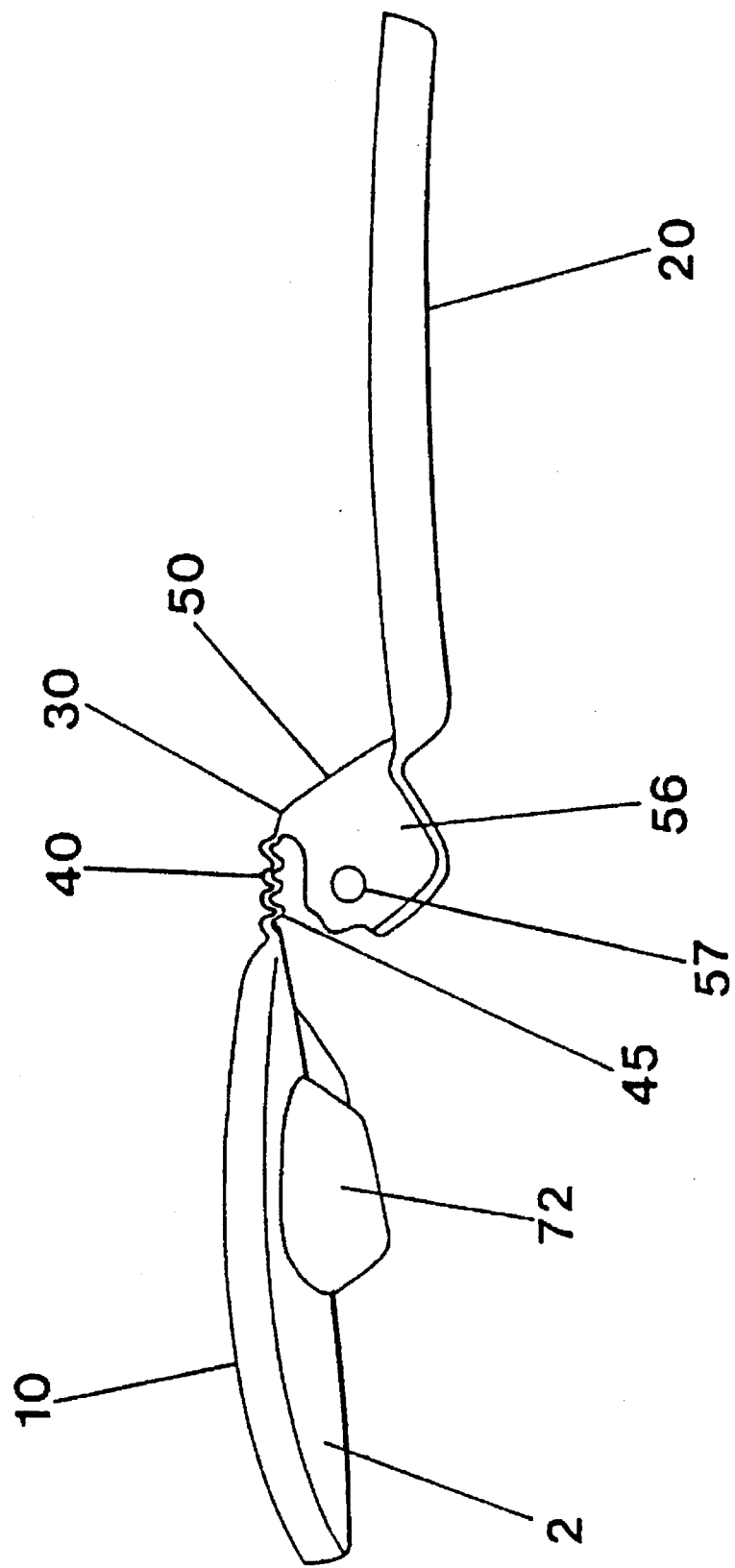
FIG. 4 illustrates an elevation view of the flexible seat shell shown in FIG. 2.

Referring now to FIG. 4, an elevation view of the flexible seat shell 2, as shown in FIG. 2, is illustrated where the intermediate section 30, is clearly visible. As discussed above, the intermediate section 30, includes an elongated flexible section 40, and an elongated resilient section 50. In a preferred embodiment, the elongated flexible section 40, includes an accordion pleated element 45. The accordion pleated section has a substantially sinusoidal cross section taken through the axis of deflection. As discussed above, the elongated resilient section 50, includes a first side 56, that is substantially perpendicular to the resilient section axis and this first side 56, is preferably provided with a seat belt bolt hole 57.

Figure 5:
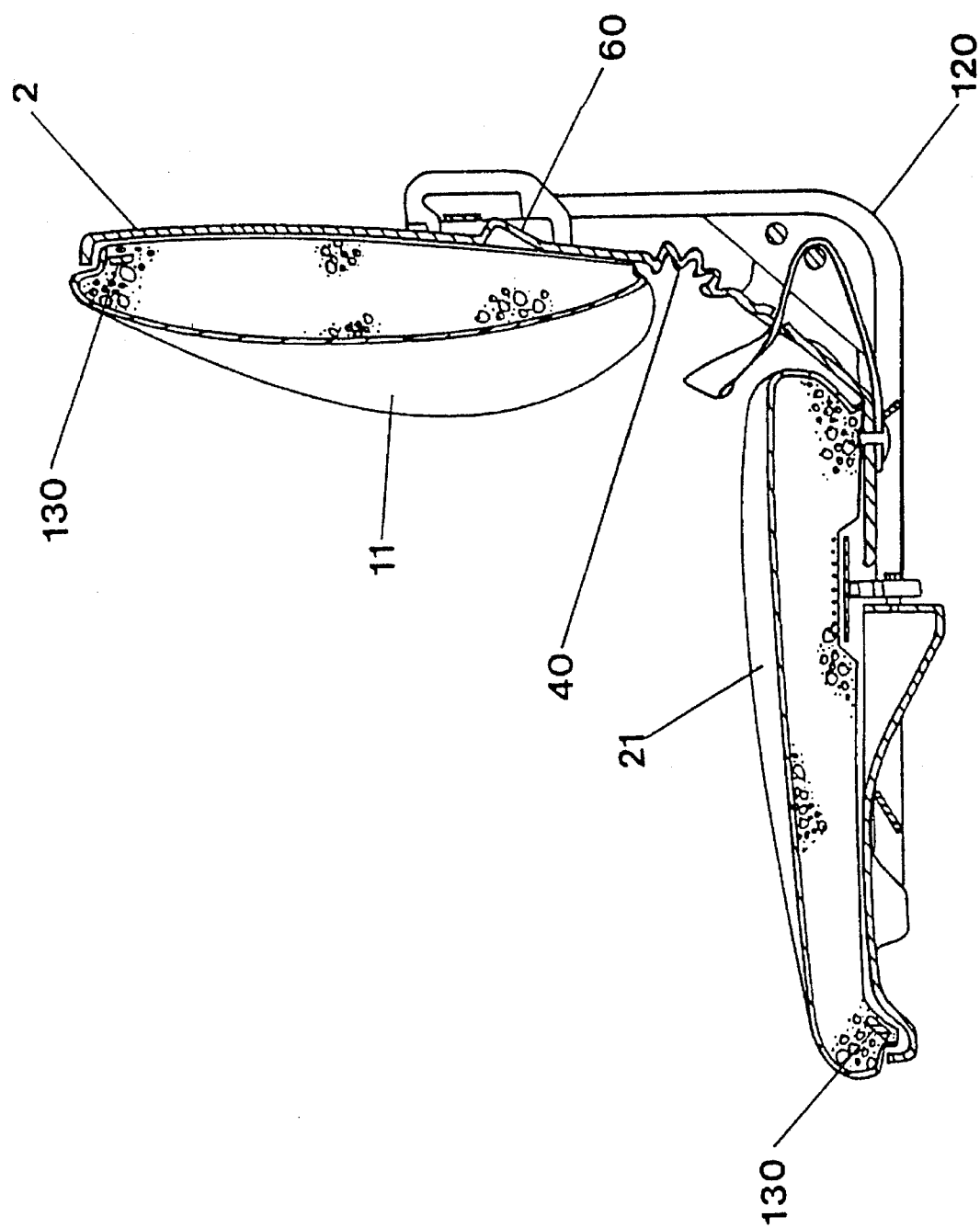
FIG. 5 illustrates a cross sectional view of a seat having a flexible seat shell according to the present invention.

Referring now to FIG. 5, a cross sectional view of a flexible seat shell 2, according to the present invention is illustrated where a back cushion 11, and a base cushion 21, have been attached to the flexible seat shell 2. The flexible seat shell 2, is shown to be also attached to frame 120.

A preferred method of providing a flexible seat shell according to the present invention will now be described. Conveniently, the fabrication of the present invention can be carried out by using any forming method. For the manufacturing operation, it is moreover an advantage to employ a thermoforming method. It is particularly preferred to employ a vacuum thermoforming method and machine.

In accordance with a particularly preferred embodiment, a vacuum thermoforming mold is provided for forming the flexible seat shell. A sheet of thermoplastic material having a first side, a second side, a softening temperature and a melting temperature is provided. The sheet of thermoplastic material is heated to a working temperature less than the melting temperature and higher than the softening temperature. The first side of the sheet is placed adjacent the vacuum thermoforming mold. The thermoplastic material is formed by applying a vacuum to the thermoplastic material through the vacuum thermoforming mold so as to mold the thermoplastic material. The thermoplastic material is allowed to cool below the softening temperature. The formed thermoplastic material is removed from the vacuum thermoforming mold.

The flexible seat shell of the present invention can be made of any thermoplastic material. Conveniently for the manufacturing operation, it is moreover an advantage to employ a high density polyethylene material for the seat shell.

The permissible thermoforming molding temperature range is a function of the type of plastic material being used for the shell. The molding temperature should be above the softening temperature of the plastic material being used and below the melting temperature of the plastic material. In an especially preferred embodiment, where high density polyethylene is used as the plastic material for the shell, the molding temperature is in the range of from approximately 300° F. to approximately 360° F.

The time required to raise the temperature of the plastic material to molding temperature is similarly a function of the type of plastic material being used for the shell. In an especially preferred embodiment, where high density polyethylene is used as the plastic material for the shell, the time required to raise the plastic material to the molding temperature is approximately 3 minutes.

The working time of the material is a function of the softening temperature of the material and the forming temperature of the material. The working time of the material is also a function of the rate of cooling.

The demolding temperature range is similarly a function of the type of plastic material being used for the shell. The demolding temperature should be below the softening temperature of the plastic material being used. In an especially preferred embodiment, where high density polyethylene is used as the plastic material for the shell, the demolding temperature is approximately 180° F.

The amount of time required to cool the plastic material to the demolding temperature is a function of the type of plastic material being used and the integrated heat capacity of the mold. In an especially preferred embodiment, where high density polyethylene is used as the plastic material for the shell, the amount of time required to reach the demolding temperature is approximately 4 minutes which can advantageously be the time used to heat a subsequent blank at another station of the vacuum thermoforming machine.

The type of heat source used to thermoform the shell can be any appropriate heat source such as, for example, radiant, gas flame or resistive element. In a particularly preferred embodiment, cloth face infrared panel heaters are used to heat the material.

The temperature of the mold itself, as distinct from the material, is below the softening temperature of the material. Advantageously, the temperature of the mold itself, as distinct from the material, is maintained within the range of from approximately 150° F. to approximately 170° F.

The temperature of cooling source depends on the type of cooling source. The cooling source is advantageously a chiller, fans, ambient temperature air cooling, or any combination thereof. A particularly preferred embodiment uses ambient temperature air together with a fan located on the top side of the plastic material above the mold. Further, a particularly preferred embodiment used a mold that has internal cooling through a chiller.

Figure 6:
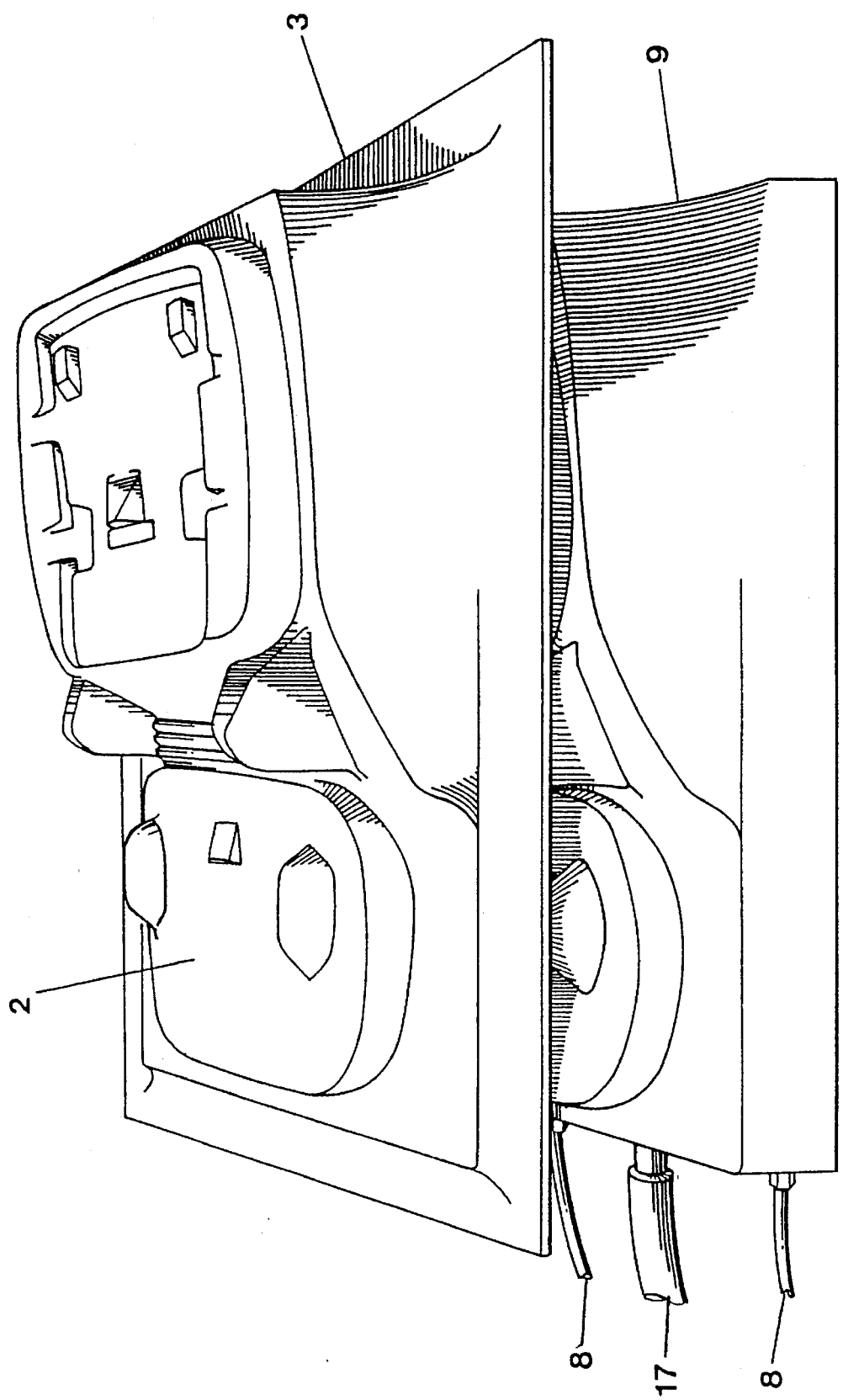
FIG. 6 illustrates an isometric view of a formed flexible seat shell blank raised above a thermoforming mold according to the present invention.

Referring now to FIG. 6, an isometric view of a formed flexible seat shell blank 3, raised above a thermoforming mold 9, according to the present invention is illustrated where the optional unitary nature of the flexible seat shell 2, is particularly apparent. The thermoforming mold 9, includes a vacuum conduit 17, and liquid coolant lines 8.

Figure 7:
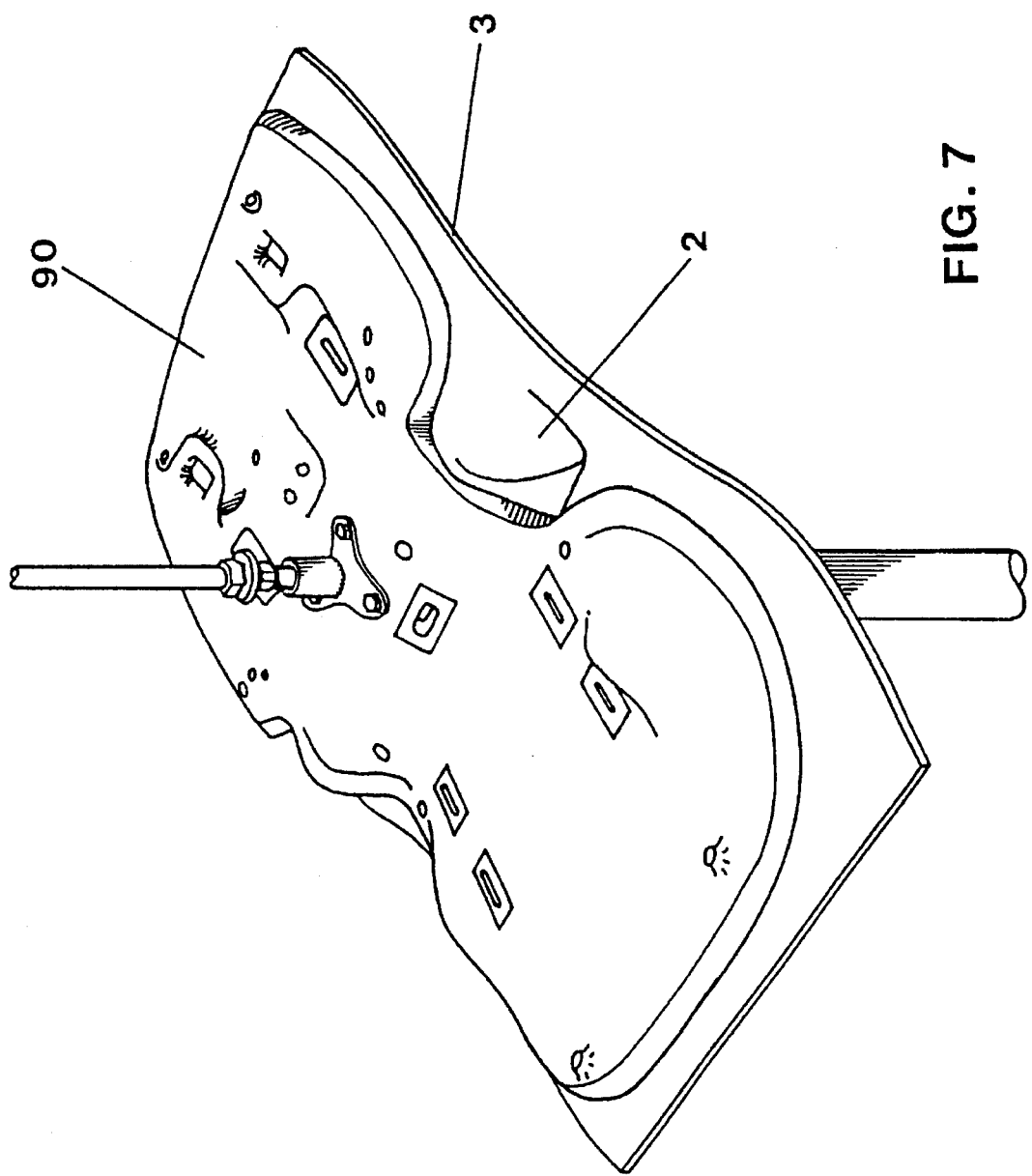
FIG. 7 illustrates an isometric view of a formed flexible seat shell blank adjacent a first trim template according to the present invention.

Referring now to FIG. 7, an isometric view of a formed flexible seat shell blank 3, adjacent a first trim template 90, according to the present invention is illustrated where excess thermoformed material extends beyond the perimeter of the first trim template 90. A first portion of the thermoplastic material is removed from around the first trim template 90, that is placed adjacent the first side of the thermoplastic material.

Figure 8:
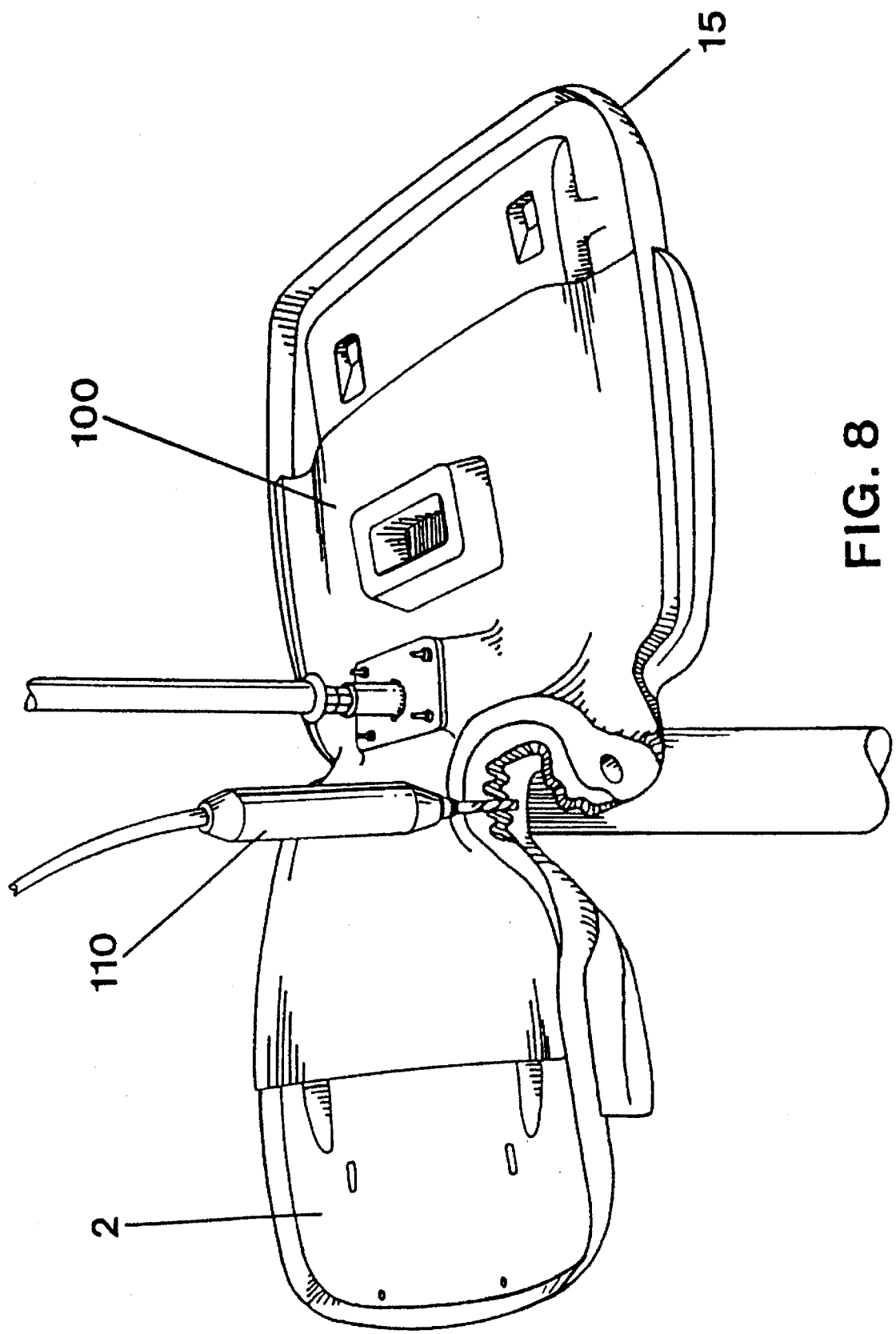
FIG. 8 illustrates an isometric view of a formed, partially trimmed, flexible seat shell blank adjacent a second trim template according to the present invention.

Referring now to FIG. 8, an isometric view of a partially trimmed formed flexible seat shell blank 15, adjacent a second trim template 100, according to the present invention is illustrated. Cutting tool 110, is shown in working engagement with excess thermoformed material of partially trimmed formed flexible seat shell blank 15. A second portion of the thermoplastic material is removed from around the second trim template that is placed adjacent the second side of the thermoplastic material. Of course, additional material can be removed while either or both of the templates are adjacent the thermoplastic material and other cutting operations can be preformed with, or without, one or both of the templates.

A preferred method of forming a strip of thermoplastic material according to the present invention will now be described. The strips of thermoplastic material are formed by clamping the strip of thermoplastic material against a surface. The present invention thus also relates to a method of making plastic rings of the type that can be termed clamp formed plastic rings.

In accordance with a preferred embodiment of the invention, a forming mold with a surface and at least one clamp is provided. The at least one clamp can be provided in accordance with the generic clamp structure disclosed in U.S. Pat. No. 4,204,825, although the combinatorial particulars and mounting of the at least one clamp can be modified to suit the instant purpose of forming a strip of thermoplastic material by clamping. A strip of thermoplastic material having a softening temperature and a melting temperature is provided. The strip of thermoplastic material is heated to a working temperature less than the melting temperature and higher than the softening temperature. The strip of thermoplastic material is placed in the clamping mold. The strip of thermoplastic material is formed by closing the at least one clamp. The strip of thermoplastic material is allowed to cool below the softening temperature. The clamps are then opened. The formed strip of thermoplastic material is removed from the die space, the formed strip thereafter having desirable holes.

In a preferred embodiment, the strip of thermoplastic material is formed into a ring of thermoplastic material by fitting the strip of thermoplastic material against the surface of the clamping mold and clamping the strip of thermoplastic material with four clamps. Optionally, at least one hole can be formed in the strip of thermoplastic material with the at least one clamp by providing at least one punch tip within a punch body and at least one die space within the clamping mold. In a particularly preferred embodiment, each of four clamps is provided with at least one punch so that a formed ring of thermoplastic material will include four holes.

Conveniently, the plastic rings of the present invention can be made of any thermoplastic material. The thermoplastic material can be reinforced or non-reinforced. For the manufacturing operation, it is moreover an advantage to employ a rigid polyvinylchloride material.

The permissible forming temperature range is a function of the type of thermoplastic material being used for the rings. The forming temperature should be above the softening temperature of the material being used and below the melting temperature of the material. In a preferred embodiment, where high density polyethylene is used as the plastic material for the shell, the molding temperature is in the range of from approximately 260° F. to approximately 300° F. In an especially preferred embodiment, where rigid polyvinylchloride is used as the material for the rings, the forming temperature is approximately 280° F.

The time required to raise the temperature of the thermoplastic material to forming temperature is similarly a function of the type of material being used for the rings and the type of heat source. In an especially preferred embodiment, where rigid polyvinylchloride is used as the material for the rings, the time required to raise the plastic material to the molding temperature is approximately 1 minute, using an electric convection oven.

The type of heat source used to form the rings can be any appropriate heat source such as, for example, radiant, gas flame or resistive element. In a particularly preferred embodiment, an electric convection oven is used to heat the material.

The working time of the material is a function of the softening temperature of the material and the forming temperature of the material. The working time of the material is also a function of the rate of cooling.

The demolding temperature range is similarly a function of the type of material being used for the rings. The demolding temperature should be below the set temperature of the material being used. In an especially preferred embodiment, where rigid polyvinylchloride is used as the material for the rings, the demolding temperature is approximately 160° F.

The amount of time required to cool the plastic material to the demolding temperature is a function of the type of material being used and the rate of heat transfer through the forming tooling and the environment. In an especially preferred embodiment, where rigid polyvinylchloride is used as the material for the rings, the amount of time required to reach the demolding temperature is approximately 2 minutes.

The temperature of the cooling source depends on the type of cooling source. The cooling source is advantageously a chiller, fans, or ambient temperature air cooling. A particularly preferred embodiment uses ambient temperature air together with a fan located on the top side of the plastic material above the mold. Further, a particularly preferred embodiment used a mold that has internal cooling through a chiller.

Figure 9:
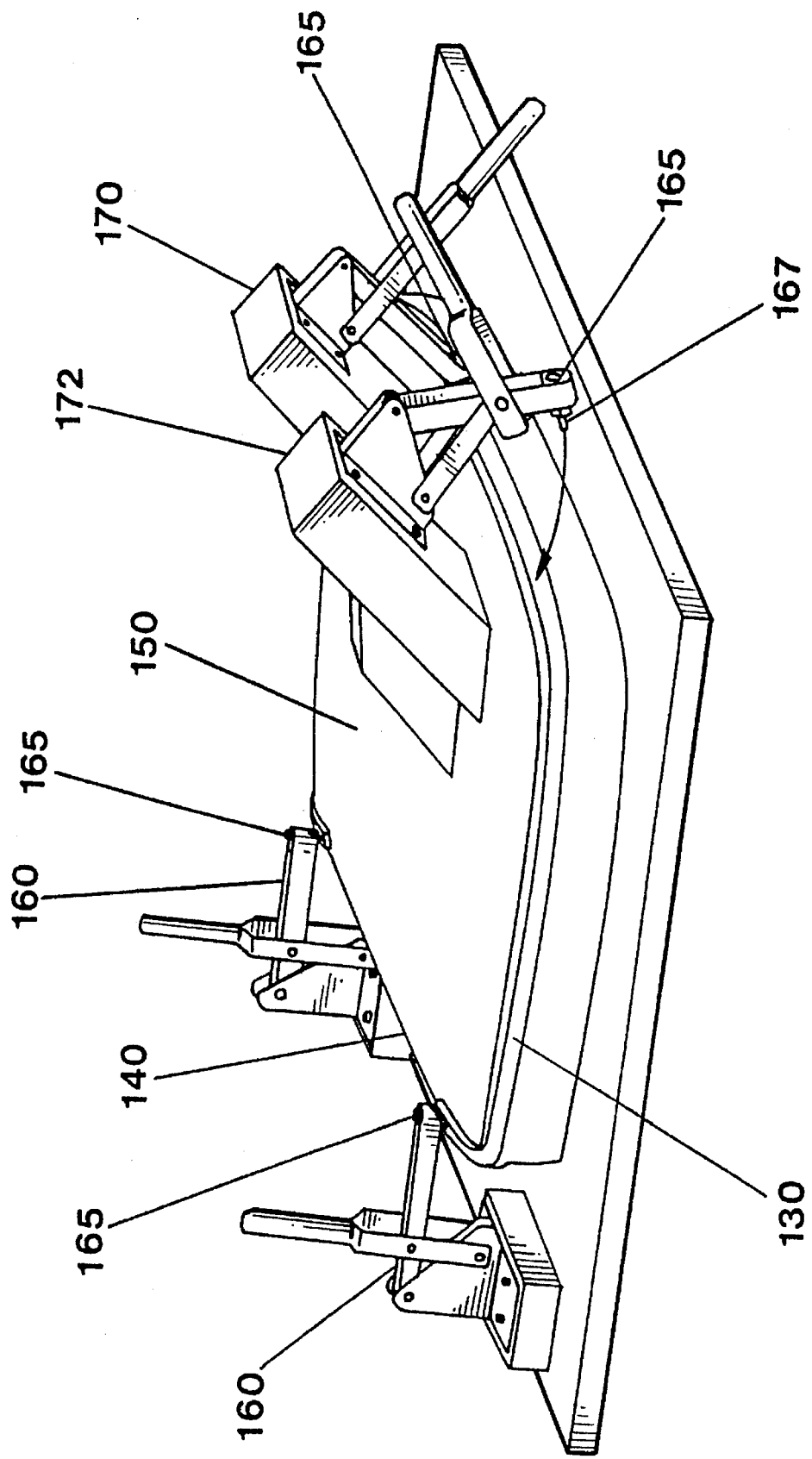
FIG. 9 illustrates an isometric view of a ring of thermoplastic material in a clamping mold according to the present invention.

Referring now to FIG. 9, an isometric view of a ring of thermoplastic material 130, fitted in the die space 140, of a clamping mold 150, according to the present invention is shown. This particular clamping mold 150, is illustrated as including two top clamps 160. Each of the top clamps 160, is shown in a closed position so as to be closed down onto, and applying pressure against, the ring of thermoplastic material 130. Each of the top clamps 160, includes a punch body 165. This particular clamping mold 150, is also illustrated as including first bottom clamp 170, and second bottom clamp 172. First bottom clamp 170, is shown to be closed up onto, and applying pressure against, the ring of thermoplastic material 130. First bottom clamp 170, includes a punch body 165. Second bottom clamp 172, is shown to be closing and not applying pressure against the ring of thermoplastic material 130. Second bottom clamp 172, also includes a punch body 165, and a punch tip 167, is illustrated as moving toward the ring of thermoplastic material 130.

A preferred method of incorporating a ring of thermoplastic material into a cushion according to the present invention will now be described. The rings of thermoplastic material can be incorporated into a cushion that contains foam according to the present invention by causing the foam to surround the rings. The present invention thus relates to a method of making seat cushions of the type that can be termed foamed seat cushions.

Figure 10:
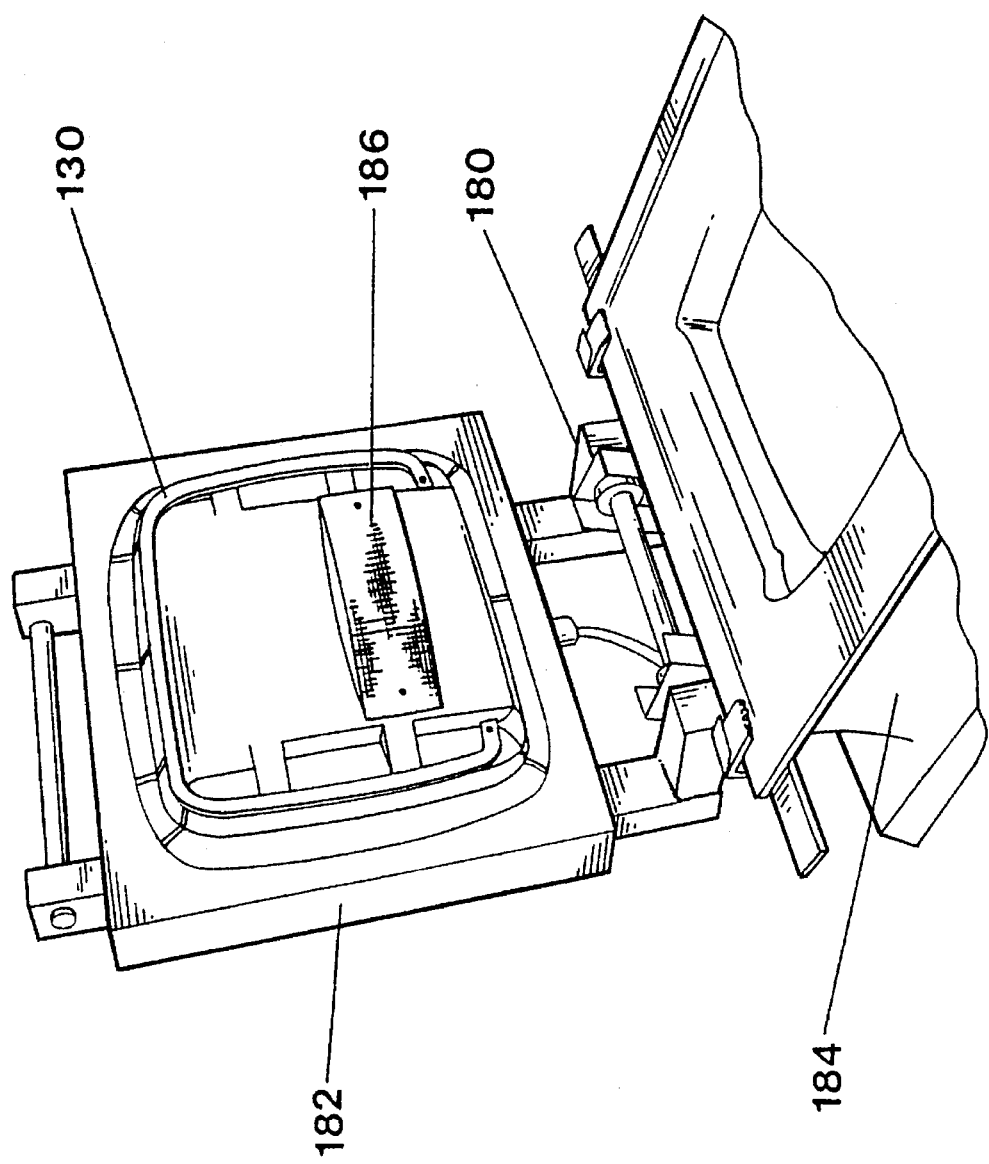
FIG. 10 illustrates an isometric view of seat cushion components in a foaming mold that is about to be closed to make a seat cushion according to the present invention.

Referring now to FIG. 10, an isometric view of seat cushion components in a foaming mold 180, that is about to be closed to make a seat cushion that incorporates a ring of thermoplastic material 130, fabricated in accordance with the present invention is shown. The foaming mold 180, can be provided in accordance with the generic structure disclosed in U.S. Pat. No. 4,190,697, although the combinatorial particulars and mounting of the foaming mold can be modified to suit the instant purpose of incorporating a ring of thermoplastic material into a cushion. The foaming mold 180, includes a mold lid 182, and mold bowl 184. A section of mesh 186, for incorporation into the seat cushion for cushion reinforcement is also visible.

A preferred method of assembling a seat according to the present invention will now be described. In order to reduce the amount of time and parts required for assembling a seat, a seat shell in accordance with the invention is pushed onto a lower section of a seat frame and then slipped down over an upper section of the seat frame. In an especially preferred embodiment of the invention, no tools are required to connect the seat shell to the seat frame.

Figure 11:
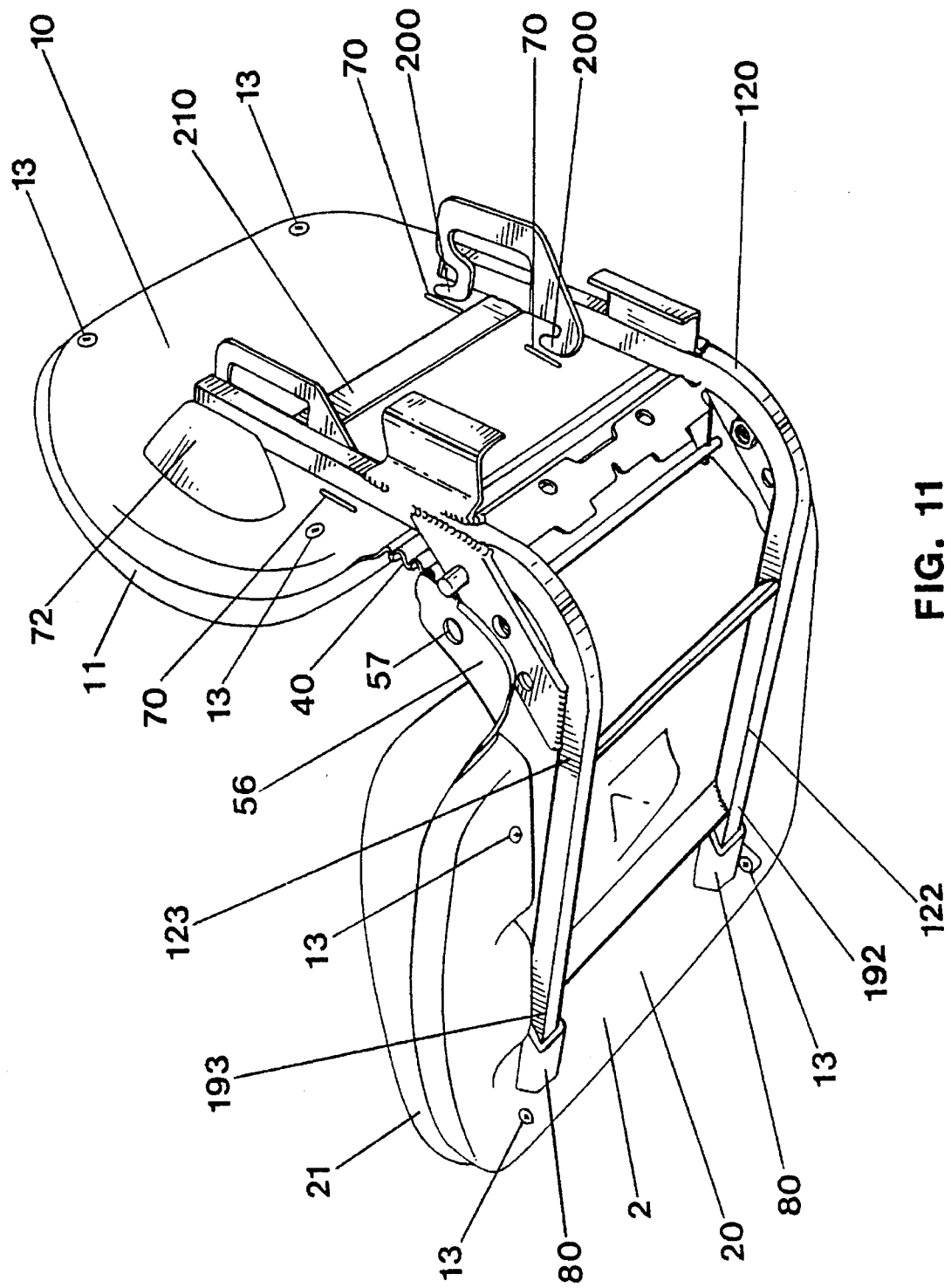
FIG. 11 illustrates an isometric view of a seat being assembled according to the present invention.

Referring now to FIG. 11, an isometric view of a seat being assembled according to the present invention is shown. Flexible seat shell 2 is advantageously previously provided with back cushion 11 and bottom cushion 21. The plurality of protrusions 190, have been inserted into a plurality of frame sockets 80, so as to engage the plurality of frame sockets 80, with the plurality of projections 190. As illustrated in FIG. 11, the plurality of hooks 200, have not yet been inserted into frame slots 70.

Figure 12:
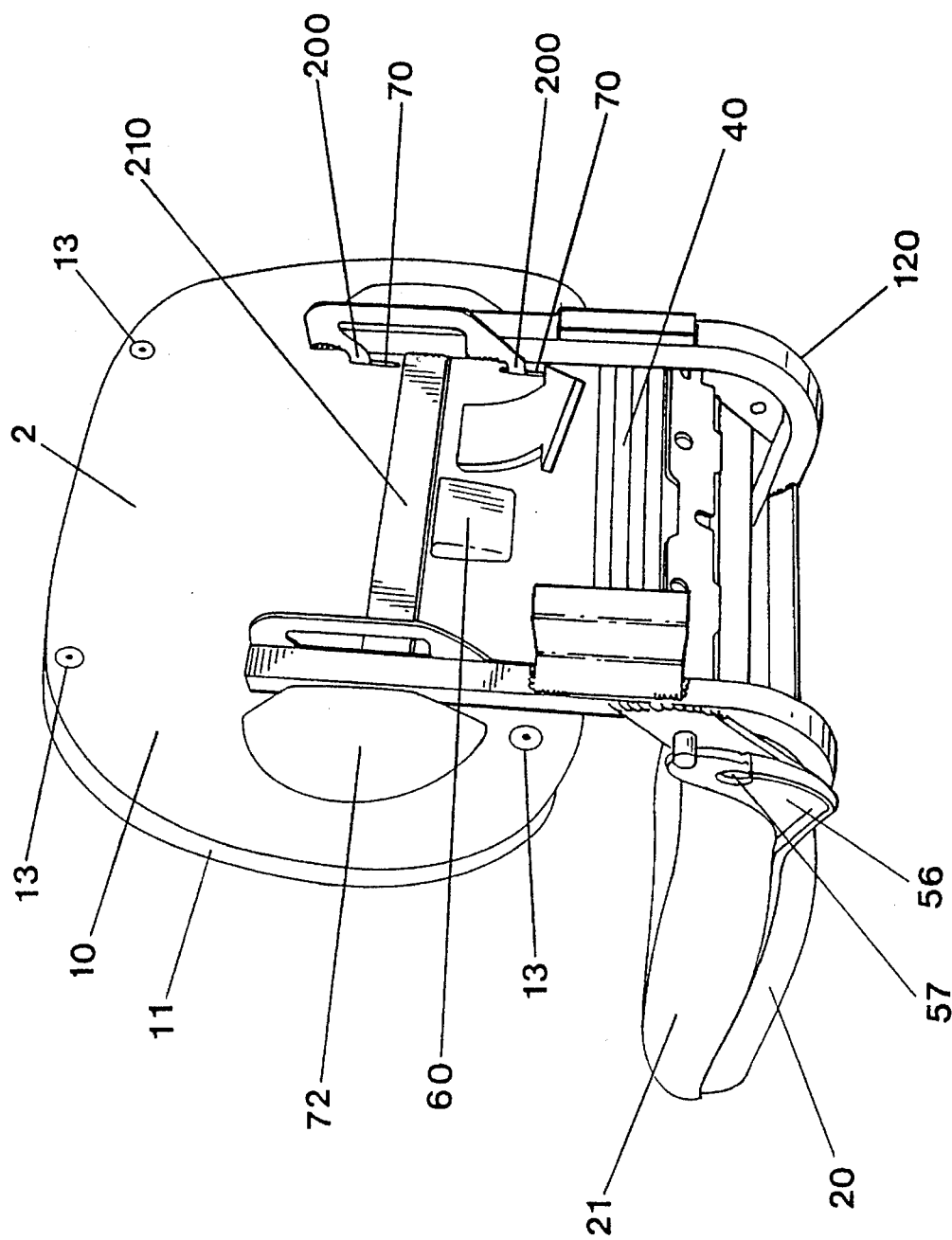
FIG. 12 illustrates an isometric view of the seat in FIG. 11 in a further state of being assembled according to the present invention.

Referring now to FIG. 12, an isometric view of the seat in FIG. 11 in a further state of being assembled according to the present invention is shown. As illustrated in FIG. 12, the plurality of hooks 200, have been inserted into the plurality of frame slots 70. The flexible seat shell 2, has been displaced so that the plurality of seat slots 70, engage the plurality of hooks 200. The displacement of flexible seat shell 2, so as to engage the snap-fit protrusion 60, of flexible seat shell 2, with bar 210, of frame 120, is illustrated.

A preferred frame according to the present invention will now be described. A particularly preferred embodiment of a seat frame according to the present invention includes protrusions and hooks for engaging a flexible seat shell. The present invention thus relates to a seat frame of the type that can be termed a hook and protrusion seat frame.

Referring again to FIG. 11, an isometric view of frame 120, according to the present invention is shown. The frame 120, includes a first frame member 122, and a second frame member 123. The first frame member includes a hook, of plurality of hooks 200, and a first protrusion 192. The second frame member 123, includes a second hook, not visible, and a second protrusion 193. The second frame member 123, is connected to the first frame member 122, with bar 210. A first end of the bar 210, is connected to the first frame member 122, and a second end of the bar 210, is connected to the second frame member 123. The first protrusion 192, can be seen to be a first tubular protrusion and the second protrusion 193, can be seen to be a second tubular protrusion.

Referring again to FIG. 12, an isometric view of the frame illustrated in FIG. 11 is shown in a further state of being assembled according to the present invention. Bar 210, can be seen to be in substantially orthogonal relationship with hooks 200. Thus bar 210, can be described as an orthogonal bar. The first frame member 122, can be seen to be a first frame tube and the second frame member 123, can be seen to be a second frame tube.

The foregoing descriptions of preferred embodiments are provided by way of illustration. Practice of the present invention is not limited thereto and variations therefrom will be readily apparent to those of ordinary skill in the art without deviating from the spirit and scope of the underlying inventive concept. For example, the versatility of the seat shell could be enhanced by providing the assembled seat with a variable geometry seat frame. In addition, although high density polyethylene is preferred for thermoforming the seat shell, any other suitable flexible material could be used in its place. Finally, the individual components need not be constructed of the disclosed materials or be formed in the disclosed shapes, but could be provided in virtually any configuration which employs a flexible section so as to provide a flexible seat shell.

Although the best mode contemplated by the inventors of carrying out the invention is disclosed above, many additions and changes to the invention could be made without departing from the spirit and scope of the underlying inventive concept. For example, numerous changes in the details of the parts of the flexible seat shell and the forming machinery, the arrangement of the parts and the construction of the combinations will be readily apparent to one of ordinary skill in the art without departing from the spirit and scope of the underlying inventive concept.

Moreover, while there are shown and described herein certain specific combinations embodying the invention for the purpose of clarity of understanding, the specific combinations are to be considered as illustrative in character, it being understood that only preferred embodiments have been shown and described. It will be manifest to those of ordinary skill in the art that certain changes, various modifications and rearrangements of the parts may be made without departing from the spirit and scope of the underlying inventive concept and that the same is not limited to the particular forms herein shown and described except insofar as indicated by the scope of the appended claims. The entirety of everything cited above or below is expressly incorporated herein by reference.

What is claimed is:

1. A method comprising:

providing a clamping mold with i) a surface having at least one die space and ii) at least one clamp having at least one punch tip located in a punch body;

providing a strip of thermoplastic material having a softening temperature and a melting temperature;

heating said strip of thermoplastic material to a working temperature higher than said softening temperature and lower than said melting temperature;

placing said strip of thermoplastic material in said clamping mold and against said surface and over said at least one die space;

forming said strip of thermoplastic material by closing said at least one clamp so as to a) form said strip of thermoplastic material with said at least one clamp and b) pierce said strip of thermoplastic material with said at least one punch tip, in one step;

cooling said strip of thermoplastic material to a removal temperature lower than said softening temperature;

opening said at least one clamp; and removing said strip of thermoplastic material from said clamping mold.

2. The method of claim 1, wherein forming said strip of thermoplastic material includes forming said strip of thermoplastic material into a ring of thermoplastic material by forming four substantially coplanar approximately right angle bends in said strip of thermoplastic material.

3. The method of claim 2, wherein i) said clamping mold includes four dies spaces and four clamps, said four clamps including four punches and ii) forming said strip of thermoplastic material includes forming four holes in said strip of thermoplastic material by piercing said strip of thermoplastic material with said four punches so as to form 1) a first hole in said strip of thermoplastic material that is proximate a first end of said strip of thermoplastic material, 2) a second hole in said thermoplastic material that is proximate a second end of said strip of thermoplastic material, 3) a third hole in said thermoplastic material that is between said first hole and said second hole 4) a fourth hole in said thermoplastic material that is between said third hole and said second hole, the third hole and the fourth hole defining axes that are substantially parallel.

4. The method of claim 3, wherein said first hole defines a first hole axis that is substantially parallel to said axes defined by the third hole and the fourth hole and said second hole defines a second hole axis that is substantially parallel to said axes defined by the third hole and the fourth hole.

5. The method of claim 1, wherein said strip of thermoplastic material consists essentially of polyvinylchloride.

6. The method of claim 1, wherein cooling said strip of thermoplastic material includes cooling said strip of thermoplastic material with a fan located above said clamping mold.

7. A method comprising:

providing a clamping mold with i) a surface having at least one die space and ii) at least one clamp having at least one punch tip located in a punch body;

providing a strip of thermoplastic material having a softening temperature and a melting temperature;

heating said strip of thermoplastic material to a working temperature higher than said softening temperature and lower than said melting temperature;

placing said strip of thermoplastic material in said clamping mold and against said surface and over said at least one die space;

forming said strip of thermoplastic material by closing said at least one clamp so as to a) form said strip of thermoplastic material with said at least one clamp and b) pierce said strip of thermoplastic material with said at least one punch tip, in one step, said at least one punch tip penetrating into said at least one die space;

cooling said strip of thermoplastic material to a removal temperature lower than said softening temperature;

opening said at least one clamp so as to withdraw said at least one punch tip from said at least one die space;

removing said strip of thermoplastic material from said clamping mold;

providing a foaming mold;

placing said strip of thermoplastic material in said foaming mold;

generating foam in said foaming mold to form a cushion that includes said strip of thermoplastic material; and removing said cushion from said foaming mold.

8. The method of claim 7, wherein forming said strip of thermoplastic material includes forming said strip of thermoplastic material into a ring of thermoplastic material by forming four substantially coplanar approximately right angle bends in said strip of thermoplastic material.

9. The method of claim 8, wherein i) said clamping mold includes four dies spaces and four clamps, each of the four clamps having at least one punch and ii) forming said strip of thermoplastic material with said at least one clamp includes forming four holes in said strip of thermoplastic material by piercing said strip of thermoplastic material with said four punches so as to form 1) a first hole in said strip of thermoplastic material that is proximate a first end of said strip of thermoplastic material, 2) a second hole in said thermoplastic material that is proximate a second end of said strip of thermoplastic material, 3) a third hole in said thermoplastic material that is between said first hole and said second hole and 4) a fourth hole in said thermoplastic material that is between said third hole and said second hole, the third hole and the fourth hole defining axis that are substantially parallel.

10. The method of claim 9, wherein said first hole defines a first hole axis that is substantially parallel to said axes defined by the third hole and the fourth hole and said second hole defines a second hole axis that is substantially parallel to said axes defined by the third hole and the fourth hole.

11. The method of claim 7, wherein said strip of thermoplastic material consists essentially of polyvinylchloride.

12. The method of claim 7, wherein cooling said strip of thermoplastic material includes cooling said strip of thermoplastic material with a fan located above said clamping mold.

13. The method of claim 7, further comprising incorporating a section of mesh into the seat cushion by placing said section of mesh in said foaming mold before the step of generating foam in said foaming mold.

14. A method comprising:

providing a clamping mold with i) a surface having at least one die space and ii) at least one clamp having at least one punch tip located in a punch body;

providing a strip of thermoplastic material having a softening temperature and a melting temperature;

heating said strip of thermoplastic material to a working temperature higher than said softening temperature and lower than said melting temperature;

placing said strip of thermoplastic material in said clamping mold and against said surface and over said at least one die space;

forming said strip of thermoplastic material by closing said at least one clamp so as to a) form said strip of thermoplastic material with said at least one clamp and b) pierce said strip of thermoplastic material with said at least one punch tip, in one step, said at least one punch tip penetrating into said at least one die space;

cooling said strip of thermoplastic material to a removal temperature lower than said softening temperature;

opening said at least one clamp so as to withdraw said at least one punch tip from said at least one die space;

removing said strip of thermoplastic material from said clamping mold;

providing a foaming mold;

placing said strip of thermoplastic material in said foaming mold;

generating foam in said foaming mold to form a cushion that includes said strip of thermoplastic material;

removing said cushion from said foaming mold;

providing a flexible seat shell with a plurality of frame sockets and a plurality of frame slots;

attaching said cushion to said flexible seat shell;

providing a frame with a plurality of hooks and a plurality of protrusions;

inserting said plurality of protrusions into said plurality of frame sockets so as to engage said plurality of frame sockets with said plurality of projections;

inserting said plurality of hooks into said plurality of frame slots; and displacing said flexible seat shell so as to engage said plurality of frame slots with said plurality of hooks.

15. The method of claim 14, wherein forming said strip of thermoplastic material includes forming said strip of thermoplastic material into a ring of thermoplastic material by forming four substantially coplanar approximately right angle bends in said strip of thermoplastic material.

16. The method of claim 15, wherein i) said clamping mold includes four dies spaces and four clamps, each of the four clamps having at least one punch and ii) forming said strip of thermoplastic material with said at least one clamp includes forming four holes in said strip of thermoplastic material by piercing said strip of thermoplastic material with said four punches so as to form 1) a first hole in said strip of thermoplastic material that is proximate a first end of said strip of thermoplastic material, 2) a second hole in said thermoplastic material that is proximate a second end of said strip of thermoplastic material, 3) a third hole in said thermoplastic material that is between said first hole and said second hole and 4) a fourth hole in said thermoplastic material that is between said third hole and said second hole, the third hole and the fourth hole defining axis that are substantially parallel.

17. The method of claim 16, wherein said first hole defines a first hole axis that is substantially parallel to said axes defined by the third hole and the fourth hole and said second hole defines a second hole axis that is substantially parallel to said axes defined by the third hole and the fourth hole.

18. The method of claim 14, wherein said strip of thermoplastic material consists essentially of polyvinylchloride.

19. The method of claim 14, wherein cooling said strip of thermoplastic material includes cooling said strip of thermoplastic material with a fan located above said clamping mold.

20. The method of claim 14, further comprising incorporating a section of mesh into the seat cushion by placing said section of mesh in said foaming mold before the step of generating foam in said foaming mold.

21. The method of claim 14, wherein said frame is provided with a bar, said flexible seat shell is provided with a snap-fit protrusion and displacing said flexible seat shell engages said snap-fit protrusion with said bar.

* * * * *